United States Patent
Kuiken et al.

(10) Patent No.: US 9,277,142 B2
(45) Date of Patent: Mar. 1, 2016

(54) INFRARED THERMAL IMAGING SYSTEM AND METHOD

(75) Inventors: Matthew T. Kuiken, Goleta, CA (US); Stephen H. Black, Buellton, CA (US)

(73) Assignee: RAYTHEON COMPANY, Waltham, MA (US)

( * ) Notice: Subject to any disclaimer, the term of this patent is extended or adjusted under 35 U.S.C. 154(b) by 855 days.

(21) Appl. No.: 13/482,194

(22) Filed: May 29, 2012

(65) Prior Publication Data

US 2013/0321639 A1    Dec. 5, 2013

(51) Int. Cl.
*H04N 5/33*    (2006.01)
*H04N 5/365*    (2011.01)
*H04N 5/232*    (2006.01)

(52) U.S. Cl.
CPC .............. *H04N 5/33* (2013.01); *H04N 5/3651* (2013.01); *H04N 5/23293* (2013.01)

(58) Field of Classification Search
CPC .... H04N 5/23293; H04N 5/33; H04N 5/3651
USPC ........................................................ 348/164
See application file for complete search history.

(56) References Cited

U.S. PATENT DOCUMENTS

| | | | |
|---|---|---|---|
| 5,811,808 A * | 9/1998 | Cannata | G01J 5/22 250/332 |
| 6,028,309 A * | 2/2000 | Parrish et al. | 250/332 |
| 6,610,984 B2 * | 8/2003 | Knauth et al. | 250/352 |
| 6,690,014 B1 | 2/2004 | Gooch et al. | |
| 7,898,571 B1 | 3/2011 | Peterson | |
| 2009/0115717 A1 | 5/2009 | Sagawa et al. | |
| 2010/0127174 A1 | 5/2010 | Tener et al. | |
| 2012/0199689 A1 | 8/2012 | Burkland | |
| 2012/0211648 A1 * | 8/2012 | Linsacum | H04N 5/33 250/252.1 |
| 2014/0061833 A1 | 3/2014 | Knight et al. | |
| 2014/0146180 A1 | 5/2014 | Denham | |

FOREIGN PATENT DOCUMENTS

| | | |
|---|---|---|
| EP | 2393281 A2 | 12/2011 |
| WO | 9835212 A1 | 8/1998 |

* cited by examiner

*Primary Examiner* — Anner Holder
(74) *Attorney, Agent, or Firm* — Lando & Anastasi, LLP

(57) ABSTRACT

An infrared thermal imaging system includes a focal plane array (FPA) of infrared detectors, read out integrated circuitry (ROIC) operatively coupled to the FPA, and a microcontroller having at least one video display interface operatively coupled to the ROIC. The FPA is configured to generate an output signal in response to infrared radiation impinging upon the infrared detectors. The microcontroller is configured to send data to the ROIC via the at least one video display interface, the data including non-uniformity correction terms for correcting non-uniformities of the FPA.

16 Claims, 2 Drawing Sheets

INFRARED THERMAL IMAGING SYSTEM AND METHOD

BACKGROUND

A microbolometer is a type of uncooled sensor for detecting infrared (IR) radiation. Conventional microbolometers include a focal plane array (FPA) of detector elements, or pixels, each of which measures a change in electrical resistance while being exposed to thermal radiation. The change in resistance is converted into an image representing a temperature corresponding to the wavelength of the radiation. Unlike images produced from light in the visible spectrum, infrared images have low contrast and must undergo significant processing (including, e.g., amplification) to produce an image that is visually pleasing to the human eye. Furthermore, materials currently used to produce uncooled IR detectors are less mature that those used for detecting visible light, and inherent non-uniformities in pixel responsivity and offset often exist within conventional focal plane arrays. When processing IR images, these non-uniformities may be amplified; this may produce undesirable results. Nonuniformity correction (NUC) algorithms are typically used by an image preprocessor to remove variations caused by the non-uniformities, as well as to compensate for the temperature of the microbolometer, improving the resulting image.

Conventional uncooled microbolometers typically use Field Programmable Gate Arrays (FPGA) to perform at least some of the image preprocessing. The FPGA may be incorporated into the FPA. Due to their complexities, NUC and contrast enhancement algorithms use significantly more processing power than, for example, a conventional video encoding algorithm. Once an FPGA design is finalized, the principal way to reduce power consumption is through the costly process of converting the FPGA design into an application-specific integrated circuit (ASIC).

SUMMARY OF THE INVENTION

Aspects and embodiments are directed to systems and methods for infrared thermal imaging, for example, an infrared thermal imaging system that uses a video interface of a microcontroller for sending nonuniformity correction terms to the focal plane array. In at least one embodiment, an infrared thermal imaging system includes a focal plane array (FPA) of infrared detectors. The FPA is configured to generate an output signal in response to impinging infrared radiation. The system further includes read-out integrated circuitry (ROIC) operatively coupled to at least one video display interface of a microcontroller.

According to one embodiment, an infrared thermal imaging system comprises a focal plane array (FPA) of infrared detectors, the FPA being configured to generate an output signal in response to infrared radiation impinging thereupon, read out integrated circuitry (ROIC) operatively coupled to the FPA, and a microcontroller having at least one video display interface operatively coupled to the ROIC, the microcontroller being configured to send data to the ROIC via the at least one video display interface, the data including non-uniformity correction terms for correcting non-uniformities of the FPA.

In one example the video display interface includes a liquid crystal display (LCD) interface. The microcontroller may be further configured to generate at least a portion of the data including correction terms for correcting the output of the FPA. The ROIC may be configured to correct thermal variations in the output of the FPA using the correction terms. In one example the data further includes synchronization data for synchronizing the output of the FPA with the data sent to the ROIC from the microprocessor, and the FPA is further configured to generate the output using the synchronization data. The ROIC may be further configured to convert the output of the FPA into a format compatible with a visible light image processor. In one example the output of the FPA includes an analog signal, and wherein the ROIC includes an analog-to-digital converter configured to convert the analog signal into a digital video signal. In another example the microcontroller is further configured to receive the digital video signal via the at least one video display interface.

Another embodiment is directed to a method of operating an infrared thermal imaging system having a focal plane array (FPA) of infrared detectors, read out integrated circuitry (ROIC) operatively coupled to the FPA, and a microcontroller including at least one video display interface operatively coupled to the ROIC. The method may comprise acts of sending data from the microcontroller to the ROIC via the at least one video display interface, the data including non-uniformity correction terms for correcting an output signal of the FPA, and sending the output signal from the ROIC to the microcontroller via the at least one video display interface, the output signal including at least one of a CMOS video signal and a CCD video signal.

In one example, the method further comprises generating, by the microcontroller, at least a portion of the data including the non-uniformity correction terms. The method may further comprise correcting thermal variations in the output of the FPA using the correction terms. In one example, the method further comprises producing synchronization data with the microcontroller, providing the synchronization data to the FPA via the at least one video display interface, and generating the output signal of the FPA using the synchronization data. In another example the method further comprises converting the output of the FPA into a format compatible with a visible light image processor. In one example the output of the FPA includes an analog signal, and the method further comprises converting, by the ROIC, the analog signal into a digital video signal, and receiving, by the microcontroller, the digital video signal via the at least one video display interface.

According to another embodiment an infrared thermal imaging system comprises a first integrated circuit (IC) chip including a focal plane array (FPA) of infrared detectors and read out integrated circuitry (ROIC), and a second IC chip including a microprocessor having at least one video display interface operatively coupled to the first IC chip, wherein the second IC is configured to send data from the microprocessor to at least one of the FPA and the ROTC via the at least one video display interface.

In one example, the video display interface includes a liquid crystal display (LCD) interface. In another example, the FPA is configured to generate a video signal output, and wherein the first IC chip is configured to correct thermal variations in the video signal output using at least a portion of the data. The FPA may be configured to generate a video signal output, wherein the second IC chip is configured to generate at least a portion of the data including synchronization data for synchronizing the video signal output with at least one of the second IC chip and an external display unit operatively coupled to the infrared thermal imaging system.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
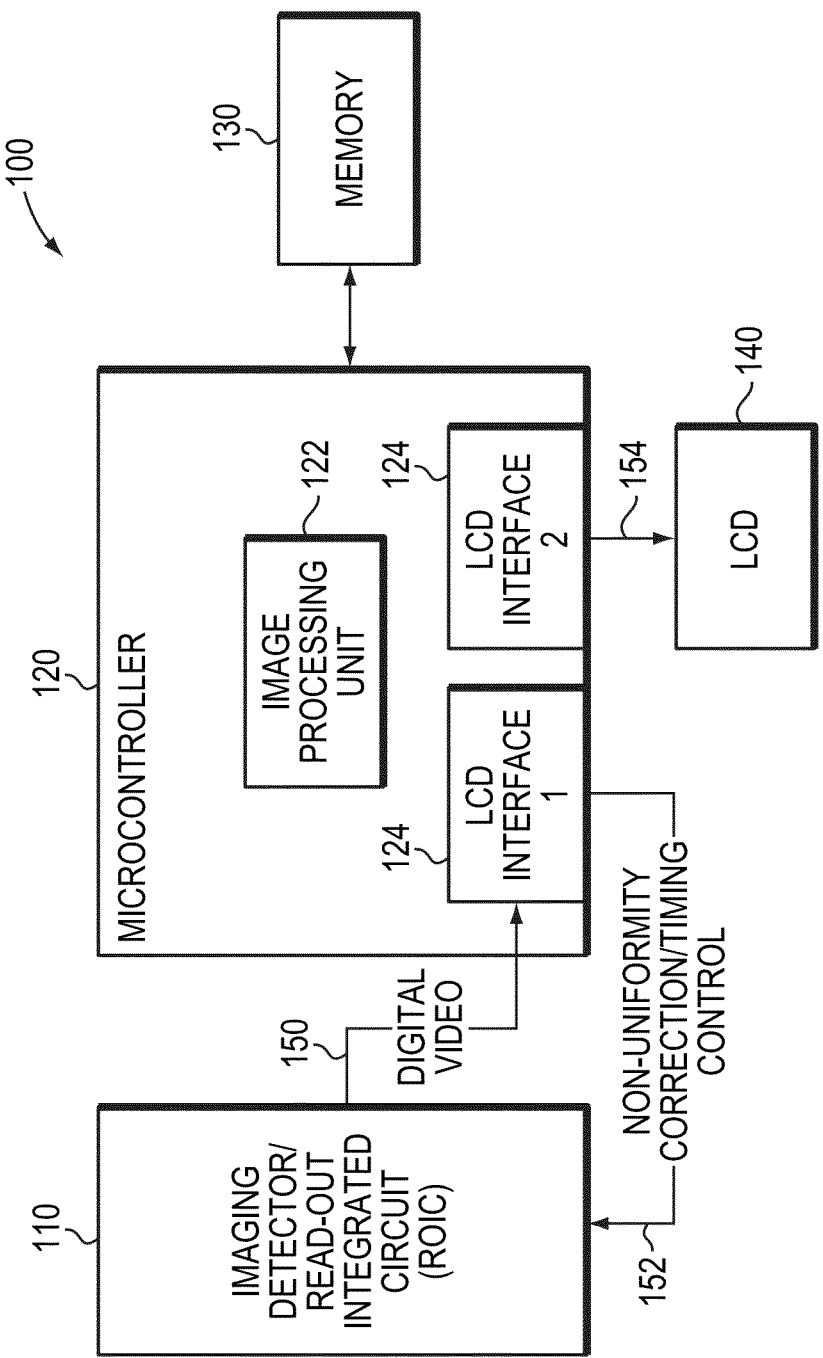
FIG. 1 is a block diagram of one example of an infrared thermal imaging system in accordance with aspects of the invention.

As discussed above, conventional uncooled microbolometers typically use FPGAs to perform non-uniformity correction and contrast enhancement, which can involve complex designs that consume large amounts of power. In contrast to FPGAs, commercially available processors for low power operation have been developed. Some of these processors have interfaces for CMOS cameras, specialized subsystems for graphics and drawing, and hardware to assist with the encoding and decoding of video streams. Often power optimization in these systems can be accomplished through software tasks to turn off subsystems, optimize processing, or reduce core voltage when the processor is not under heavy load. Such processors may also provide access to other functions, including video encoding (e.g., H.264), streaming algorithms for transferring video data over IP networks, and web server implementations for microbolometer configuration and control.

It is appreciated that interfacing a conventional uncooled microbolometer FPA to a processor is difficult. The FPA requires specific data at certain points in a video frame, and the data coming back from the FPA is timed based on the number of master clock cycles. This interface is not compatible with a conventional microprocessor. A typical FPA may have an analog interface; however, this interface requires expensive electronics, and the flexibility of an FPGA to maintain.

Aspects and embodiments are directed to systems and methods for infrared thermal imaging. In at least one embodiment, an infrared thermal imaging system includes a focal plane array (FPA) of infrared detectors, read-out integrated circuitry (ROIC), and a microprocessor having at least one video display interface (e.g., a bi-directional parallel data interface). The microcontroller is configured to send data, including non-uniformity correction terms, to the FPA/ROIC via the video display interface. In this manner, the microprocessor can perform at least some of the image preprocessing functions that, in prior techniques, were typically performed by an FPGA. The microprocessor, by design, can be flexible and easily programmable, and some commercially available microprocessors include video display or other parallel data interfaces, which simplifies the design and manufacture of an infrared thermal imaging system according to at least one embodiment.

According to one aspect, it is appreciated that by moving image preprocessing circuitry into the FPA and adding timing interface logic, the FPA can be made to look much more like a CMOS sensor to downstream devices (e.g., image processing or display devices). By placing a high speed analog-to-digital converter (ADC) onto the FPA/ROIC, power can be saved by eliminating a high speed analog multiplexer and a single ADC on each video column. The outputs of the ADC may be multiplexed together on a low power digital bus. Adding digital timing signals allows the output of the FPA to be tied into the CMOS camera input of a commercial processor.

By further implementing standard internet protocol (IP) into the microprocessor for video encoding and streaming, virtually any device with a web browser and a compatible video decoder may display a video stream received from the IR thermal imaging system, in accordance with various embodiments. For example, a personal digital assistant (PDA) will be able to display the video stream and control the system settings. The interface to the system may be, for example, through a built-in web browser, or through a custom application loaded onto the PDA.

As discussed above, the FPA requires correction terms and other data for each pixel to operate. Storing this data in the ROIC may increase the density of logic in the chip, resulting in dramatic decreases in production yield, and thus is undesirable. However, some commercial available microprocessors, such as the i.MX6 series of processors from Freescale Semiconductor Inc., of Austin, Tex., include two LCD monitor ports or other parallel data interfaces (e.g., an eight-bit parallel data interface). These LCD ports are reconfigurable in terms of clock frequency, line rate, and frame rate. According to one embodiment, one of the LCD ports can be used to send data (including, e.g., the correction terms) at the pixel clock rate from the microprocessor to the FPA. Further, the FPA uses configuration and setup information. In another embodiment, a serial peripheral interface (SPI) bus can be added to the ROIC for reading and writing the configuration data using a standard serial protocol, simplifying system setup and configuration.

FIG. 1 is a block diagram of one example of an infrared thermal imaging system 100, according to one embodiment. The system 100 includes a focal plane array (FPA)/read-out integrated circuit (ROIC) 110, a microcontroller 120 and a memory 130. In some embodiments, the memory 130 may include synchronous dynamic random access memory (SDRAM) or other high-speed memory device. In some embodiments, the system 100 may further include an LCD display 140 or other device for viewing images, graphics and/or video.

The FPA/ROIC 110 includes an array of infrared detectors configured to generate an output signal in response to infrared radiation impinging upon the detectors, and circuitry for converting the infrared radiation into a digital video signal 150. The microprocessor 120 includes, among other things, an image processing unit 122 and at least one video display interface 124, such as an interface adapted for sending a video output signal 154 to the liquid crystal display (LCD) 140. The microprocessor 120 may include, for example, other functional components such as a video processing unit, a graphics processing unit, an embedded processor, a single instruction, multiple data digital signal processor (SIMD DSP), and internal memory (not shown). The video display interfaces 124 may, for example, be configured to send and receive eight or 14 bits of data. At least one of the video display interfaces 124 is operatively coupled to the FPA/ROIC 110. In one embodiment, the FPA/ROIC 110 and the microprocessor 120 are manufactured as separate chips.

The video display interface 124 includes a parallel data interface (e.g., eight-bit) configured to permit a bidirectional exchange of digital video 150 and data 152 between the microcontroller 120 and the FPA/ROIC 110. In one embodiment, the data includes correction data provided by the microcontroller 120 for use by NUC algorithms that execute on the FPA/ROIC 110. The NUC algorithms can be used for calibrating the infrared pixels, such as described above. In another embodiment, the data includes configuration and setup information provided to the FPA/ROIC 110.

In one embodiment, the data includes timing control signals, which can be used to synchronize the IR detectors with the video output signal 154. For example, the data 152 may be sent by the microcontroller 120 to the FPA/ROIC 110 at the same pixel clock rate used by the read-out circuit to update the digital video signal 150. The timing relationship between the digital video signal 150 received by the microcontroller 120 and the video output signal 154 is predictable. Therefore, the timing control signals can be used, for example, to synchronize the NUC data being sent to the FPA/ROIC 110 with the read-out updates generated by the FPA/ROIC to avoid image distortion that could be caused if the correction terms are not applied in synchronization with the updates.

In one embodiment, FPA/ROIC 110 includes an analog-to-digital converter (not shown) for converting an analog signal produced by the focal plane array into the digital video signal 150. Additionally, the FPA/ROIC 110 may be further configured to convert the digital video signal 150 into a format that is compatible with a visible light image processor (e.g., the image processing unit 122 or another image processor either within the microcontroller 120 or external to the microcontroller) and/or a visible light display, such as an LCD display. In another embodiment, the visible light image processor is compatible with CCD (charge-coupled device) image sensor signals. By converting the IR image produced by the focal plane array in this manner, the digital video output 150 of the FPA/ROIC 110 is compatible with conventional visible light image processors, and therefore the system 100 does not require additional circuitry, simplifying the design of the system.

In some embodiments, the system 100 or portions thereof may be included in a camera (not shown). For example, the camera may include a lens configured to focus infrared radiation onto the FPA and an integral LCD display for viewing images generated by the system 100.

Figure 2:
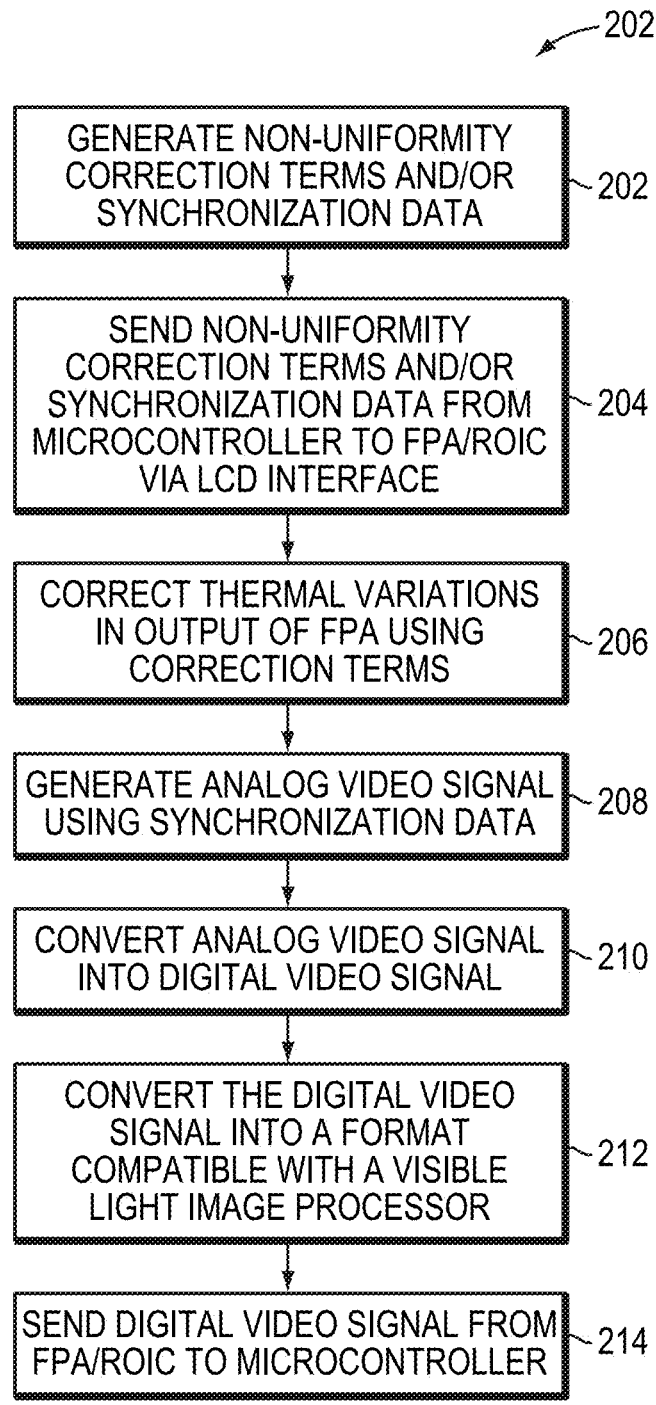
FIG. 2 is a flow chart of one example of a method of operating an infrared thermal imaging system in accordance with aspects of the invention.

FIG. 2 is a flow chart of one example of a method 200 of operating an infrared thermal imaging system, according to one embodiment. As discussed above, IR detectors have inherent non-uniformities that, if not corrected, will distort the image. Non-uniformity correction terms are generated by a microprocessor (e.g., microprocessor 120 of FIG. 1) to compensate for the non-uniformities in the focal plane array (block 202). Synchronization and other timing data, such as described above with respect to FIG. 1, can also be generated. The non-uniformity terms and/or the synchronization data may then be sent from the microprocessor to the read-out circuit (e.g., FPA/ROIC 110 of FIG. 1) via a video display interface (e.g., LCD interface 124 of FIG. 1) or other parallel data interface of the microprocessor (block 204).

Upon receiving the non-uniformity terms from the microprocessor, the read-out circuit calibrates the focal plane array using the non-uniformity terms (block 206). Such calibration includes correcting the output of the pixels to compensate for thermal variations in the focal plane array. Subsequent to calibration, an analog video signal is generated (block 208). The analog video signal may be generated using the synchronization data, such as described above with respect to FIG. 1. In one embodiment, the read-out circuit includes an analog-to-digital converter (ADC). The ADC converts the analog video signal into a digital video signal (block 210). In another embodiment, the read-out circuit is configured to convert the digital video signal into a formal compatible with a visible light image processor, such as a CCD image processor (block 212). The digital video signal is then sent from the read-out circuit to the microcontroller for further processing (block 214) and/or for display on, e.g., an LCD display.

Aspects and embodiments are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. An infrared thermal imaging system comprising:
   a focal plane array (FPA) of infrared detectors, the FPA being configured to generate an output signal in response to infrared radiation impinging thereupon, the output signal including an analog signal;
   read out integrated circuitry (ROIC) operatively coupled to the FPA and including an analog-to-digital converter configured to convert the analog signal into a digital video signal; and
   a microcontroller having at least one bidirectional video display interface operatively coupled to the ROIC, the microcontroller being configured to receive the digital video signal from the ROIC via the at least one bidirectional video display interface and to send data to the ROIC via the at least one bidirectional video display interface, the data including non-uniformity correction terms for correcting non-uniformities of the FPA.

2. The infrared thermal imaging system of claim 1, wherein the at least one video display interface includes a liquid crystal display (LCD) interface.

3. The infrared thermal imaging system of claim 1, wherein the microcontroller is further configured to generate at least a portion of the data including correction terms for correcting the output signal of the FPA.

4. The infrared thermal imaging system of claim 3, wherein the ROIC is configured to correct thermal variations in the output signal of the FPA using the correction terms.

5. The infrared thermal imaging system of claim 4, wherein the data further includes synchronization data for synchronizing the output signal of the FPA with the data sent to the ROIC from the microprocessor, and wherein the FPA is further configured to generate the output signal using the synchronization data.

6. The infrared thermal imaging system of claim 5, wherein the ROIC is further configured to convert the output signal of the FPA into a format compatible with a visible light image processor.

7. A method of operating an infrared thermal imaging system having a focal plane array (FPA) of infrared detectors, read out integrated circuitry (ROIC) operatively coupled to the FPA, and a microcontroller including at least one bidirectional video display interface operatively coupled to the ROIC, the method comprising:
 sending data from the microcontroller to the ROIC via the at least one bidirectional video display interface, the data including non-uniformity correction terms for correcting an output signal of the FPA, the output signal including an analog signal;
 converting, by the ROIC, the analog signal into a digital video signal including at least one of a CMOS video signal and a CCD video signal; and
 sending the digital video signal from the ROIC to the microcontroller via the at least one bidirectional video display interface.

8. The method of claim 7, further comprising generating, by the microcontroller, at least a portion of the data including the non-uniformity correction terms.

9. The method of claim 8, further comprising correcting thermal variations in the output signal of the FPA using the correction terms.

10. The method of claim 9, further comprising:
 producing synchronization data with the microcontroller;
 providing the synchronization data to the FPA via the at least one video display interface; and
 generating the output signal of the FPA using the synchronization data.

11. The method of claim 10, further comprising converting the output signal of the FPA into a format compatible with a visible light image processor.

12. The method of claim 11, wherein the method further comprises receiving, by the microcontroller, the digital video signal from the ROIC via the at least one bidirectional video display interface.

13. An infrared thermal imaging system, comprising:
 a first integrated circuit (IC) chip including a focal plane array (FPA) of infrared detectors and read out integrated circuitry (ROIC), the first IC chip configured to generate a video signal output in response to infrared radiation impinging thereupon; and
 a second IC chip including a microprocessor having at least one bidirectional video display interface operatively coupled to the first IC chip;
 wherein the first IC chip is configured to send the video signal output to the microprocessor via the at least one bidirectional video display interface; and
 wherein the second IC is configured to send data from the microprocessor to at least one of the FPA and the ROIC via the at least one bidirectional video display interface.

14. The infrared thermal imaging system of claim 13, wherein the at least one video display interface includes a liquid crystal display (LCD) interface.

15. The infrared thermal imaging system of claim 14, wherein the FPA is configured to generate an output in response to infrared radiation impinging thereupon, and wherein the first IC chip is configured to correct thermal variations in the output of the FPA using at least a portion of the data.

16. The infrared thermal imaging system of claim 15, wherein the second IC chip is configured to generate at least a portion of the data including synchronization data for synchronizing the output of the FPA with at least one of the second IC chip and an external display unit operatively coupled to the infrared thermal imaging system.

* * * * *

UNITED STATES PATENT AND TRADEMARK OFFICE
CERTIFICATE OF CORRECTION

| | | |
|---|---|---|
| PATENT NO. | : 9,277,142 B2 | Page 1 of 1 |
| APPLICATION NO. | : 13/482194 | |
| DATED | : March 1, 2016 | |
| INVENTOR(S) | : Matthew T. Kuiken et al. | |

It is certified that error appears in the above-identified patent and that said Letters Patent is hereby corrected as shown below:

In the Specification:
Column 1, after the title, add the following paragraph:
GOVERNMENT LICENSE RIGHTS
This invention was made with government support under Contract No. HR0011-11-C-0125, awarded by the Department of Defense. The government has certain rights in the invention.

Signed and Sealed this
Third Day of May, 2016

Michelle K. Lee
*Director of the United States Patent and Trademark Office*

UNITED STATES PATENT AND TRADEMARK OFFICE
CERTIFICATE OF CORRECTION

PATENT NO. : 9,277,142 B2
APPLICATION NO. : 13/482194
DATED : March 1, 2016
INVENTOR(S) : Matthew T. Kuiken et al.

It is certified that error appears in the above-identified patent and that said Letters Patent is hereby corrected as shown below:

In the Specification:

At Column 2, line number 49, delete "ROTC" and insert -- ROIC --.

Signed and Sealed this
Twenty-eighth Day of June, 2016

Michelle K. Lee
*Director of the United States Patent and Trademark Office*